United States Patent
Mangano et al.

(10) Patent No.: US 12,399,947 B2
(45) Date of Patent: Aug. 26, 2025

(54) AI DRIVEN PAGE NAVIGATION BASED ON USER BEHAVIOR

(71) Applicant: Salesforce, Inc., San Francisco, CA (US)

(72) Inventors: Andrew Mangano, Sunnyvale, CA (US); Saket Agarwal, San Meteo, CA (US); Umesh Prabhakar Zope, Fremont, CA (US); Saurabh S. Davala, Saratoga, CA (US); Stephen Goldberg, Frisco, TX (US)

(73) Assignee: Salesforce, Inc., San Francisco, CA (US)

( * ) Notice: Subject to any disclaimer, the term of this patent is extended or adjusted under 35 U.S.C. 154(b) by 108 days.

(21) Appl. No.: 17/948,678

(22) Filed: Sep. 20, 2022

(65) Prior Publication Data
US 2024/0095294 A1    Mar. 21, 2024

(51) Int. Cl.
*G06F 16/90*    (2019.01)
*G06F 16/954*   (2019.01)
*G06F 16/957*   (2019.01)

(52) U.S. Cl.
CPC ........ *G06F 16/954* (2019.01); *G06F 16/9574* (2019.01)

(58) Field of Classification Search
CPC ............................ G06F 16/954; G06F 16/9574
See application file for complete search history.

(56) References Cited

U.S. PATENT DOCUMENTS

| | | | |
|---|---|---|---|
| 11,863,641 B1* | 1/2024 | Schlerf | G06F 16/954 |
| 2014/0298194 A1* | 10/2014 | Prasad | G06F 3/0482 |
| | | | 715/745 |
| 2021/0342128 A1* | 11/2021 | Carraway | G06F 9/451 |
| 2023/0195819 A1* | 6/2023 | Shalaby | G06F 11/3438 |
| | | | 706/12 |

OTHER PUBLICATIONS

Qin et al., To Compress, or Not to Compress: Characterizing Deep Learning Model Compression for Embedded Inference. 2018 IEEE ISPA/IUCC/BDCloud/SocialCom/SustainCom. 2018 [retrieved May 30, 2024]. Retrieved from the Internet: https://api.semanticscholar.org/CorpusID:53047435 (Year: 2018).*

* cited by examiner

*Primary Examiner* — Kristopher Andersen
(74) *Attorney, Agent, or Firm* — Sterne, Kessler, Goldstein & Fox P.L.L.C.

(57) ABSTRACT

Disclosed herein are system, method, and computer program product embodiments for implementing AI driven application navigation recommendations based on user behavior. An embodiment operates by generating a trained machine learning model using training data obtained based on historical navigation logs corresponding to the web application. The embodiment deploys a reduced machine learning model within an instance of the web application, and the reduced machine learning model is generated by compressing the trained machine learning model. The embodiment then generates the page navigation recommendation using the reduced machine learning model based on an encoded navigation breadcrumb data corresponding to the instance of the web application.

17 Claims, 3 Drawing Sheets

AI DRIVEN PAGE NAVIGATION BASED ON USER BEHAVIOR

BACKGROUND

One or more implementations relate to the field of enterprise web application design, and more specifically, to page navigation design in enterprise web applications.

Modern enterprise web applications are complex systems with hundreds of pages and a rich set of features. Due to the complexity of an enterprise application, a new user might be faced with an overwhelming number of navigation possibilities. Difficulty in navigating and using an application may hinder its large-scale adoption. Accordingly, a need exists to provide end users with intelligent solutions that would improve ease of use and navigation.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing AI driven application navigation recommendations based on user behavior.

Enterprise web applications may contain hundreds of pages and features that a user can navigate to, making their usage potentially extremely complex. Navigating a new interface for the first time may be overwhelming with too many options. However, historical application log data can be leveraged to improve the usability and ease of navigation of an enterprise web application. For example, application log data that documents organization-wide user navigation behavior may be used to train an AI or a neural network model to generate an intelligent page navigation recommendation with an application In addition, a lightweight reduced version of the trained neural network model may subsequently be ported to a user device to generate page recommendations at the user device.

Various embodiments of these features will now be discussed with respect to the corresponding figures.

Figure 1:
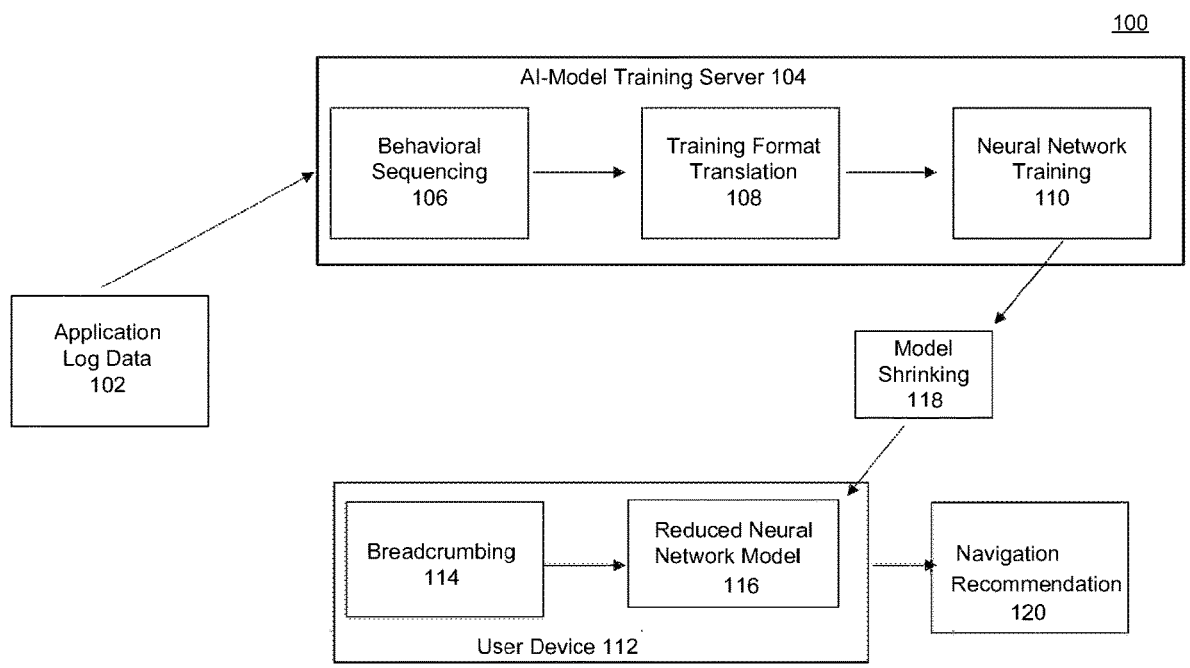
FIG. 1 illustrates a block diagram of an exemplary environment 100 for implementing a neural network model to generate a page navigation recommendation, in accordance with some embodiments.

FIG. 1 illustrates an example system 100 for implementing a machine learning model to generate a page navigation recommendation, in accordance with some embodiments. The system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

The system 100 may include an AI-model training server 104 and a client device 112. According to some aspects, the AI-model training server 112 may include a behavioral sequencing module 106, a training format translation module 108, and a neural network training module 110. The application log data 102 is used as training input by the neural network training module 110 to generate a trained machine learning or a trained neural network model. The user device 112 may import and implement a reduced version of the trained model to generate a navigation recommendation 120. According to some aspects, the client device 112 may be a mobile phone, a personal computer, a laptop computer, or other types of computing or communication devices. The client device 112 can be a portable electronic device, or a browser located in the portable electronic device.

Application log data 102 documents users' interaction with the enterprise web application. According to some aspects, the application log data 102 may be generated to measure page loading performance and includes information corresponding to application users' navigational behavior. According to some aspects, when a user navigates to page, a page view log may be created and stored on an application log database. According to some aspects, an entry in the application log may be created in response to a user actions (e.g., selecting a tab, checking a box, performing a mouse click event, etc.). According to some aspects, each navigable component of the enterprise application may be assigned a unique identifier. A unique identifier may be associated with each page, tab, feature, and/or the like of the enterprise application (e.g., page ID, tab ID, feature ID, etc.). Each user that interacts with the enterprise application and/or each user-session of the enterprise application may be identified with a unique identifier (e.g., a user ID, a session ID, etc.).

According to some aspects, an application log server may store application log data obtained based on application interaction activity generated by all users within an organization. According to some aspects, each entry of the application log may include an identifier corresponding a component of the application (e.g., a page ID, a tab ID, a feature ID, etc.), an identifier corresponding to a user interacting with the application (e.g., user ID, user-role ID, session ID, etc.), and a time stamp denoting the date and time of the day at which the user interaction/activity has occurred.

According to some aspects, behavioral sequencing module 106 process the application log data to identify users' behavioral patterns as they interact with the enterprise application. Data corresponding to users' historical behavioral patterns may be used to train a machine learning or a neural network model to generate navigation recommendations. Also, the application log data may also include information that is not relevant and/or useful for training a machine learning or a neural network model. According to some aspects, the behavioral sequencing module 106 may perform data mining operations on the application log data to extract user behavior patterns. According to some aspects, the behavioral sequencing module may perform clustering operations to identify user behavior patterns. The behavioral sequencing module may perform clustering operations on the application log data based on user IDs and/or session IDs. The behavioral sequencing module 106 may then identify sequences of user actions (e.g., sequences of page views and/or tabs views, and the like) from the clustered application log entries. According to some aspects, all application log entries that were generated within a predefined interval of time, and associated with a single user ID, may be clustered into a user session log data.

According to some aspects, the behavior sequence module 106 may identify and extract users' behavioral patterns from the clustered application log entries using the time stamp information in the application log data 102. According to some aspects, information corresponding to a user behavioral pattern or a user action sequence may include page IDs corresponding to a chronological sequence of pages of the enterprise application that were visited by the user. For each page in a user action sequence, the behavioral sequence module 106 may also identify information regarding the duration of time the page was kept open by a user. According to some aspects, a user action sequences may be generated from the application log data based on one or more parameters such as the time of the day, user ID, and the role of the user within the organization. According to some aspects, a data mining procedure may be applied to cluster application log data 102 to identify user behavior sequences based on one or more parameters such as the time of the day, user IDs, and/or user-role IDs.

According to some aspects, the training format translation module 108 converts the user action sequences identified by the behavioral sequencing module 106 into numeric vectors or tensors of user actions which are applicable for machine learning training. According to some aspects, the numeric vectors or tensors of user actions may be as used as inputs for training a machine learning or a neural network model using a supervised or unsupervised learning approach. According to some aspects, the numeric vectors of a training data set may include information corresponding to a time of the day and a role of a user, along with numerical information corresponding to user action sequences, such as page IDs, tab IDs, and/or the like. According to some aspects, the training data input may be matrix having the numeric vectors or tensors of user actions as row vectors. According to some aspects, the numeric vectors or tensors may be decimal, hexadecimal, or binary vectors or sequences.

According to some aspects, the training format translation module 108 may generate a numeric vector corresponding to each user action sequence identified by the behavioral sequencing module 106. According to some aspects, each numeric vector may include a predefined number of page IDs and/or tab IDs in a binary or non-binary format. According to some aspects, each numeric vector may include a predefined number of identifiers, each corresponding to a user action in a user action sequence. For example, each numeric vector may be a predefined length sequence of page IDs and/or tab IDs. According to some aspects, the numeric vectors or tensors of user actions may include data corresponding to the time of the day information and/or user-role information. As a non-limiting example, a numeric vector may include the following variables/fields: [user_role_ID, time of the day, ID_1, ID 2, . . . , ID_N, next ID]. According to some aspects, the variable "user_role_ID" may uniquely identify the role of user within the organization, and the variable "time of the day" may identify the hour of the day. The "N" variables, "ID_1" through "ID_N," may correspond to identifiers of the sequence of pages/tabs visited by a user. According to some aspects, each variable/field of a numeric vector may have a predefined length (e.g., all identifiers are 4-bit binary sequences).

According to some aspects, when using the generated numeric vectors as input training data for supervised training of the neural network model, the user-role information, the time of the day information, and the sequence of "N" page/tab identifiers may be tagged as input elements and the page/tab identifier corresponding to "next-ID" may be tagged as an output for the model. According to some aspects, the vector sequences used as training data do not include information specific to users, such as User IDs and the like. According to some aspects, the training data input may be in the form of matrix with the first "N+2" columns corresponding to the tagged as training inputs and the last column may be tagged as the training output.

According to some aspects, the numeric vectors or tensors of user actions generated by the training format translation module 108 may be used by the neural network training module 110 to train a neural network model. According to some aspects, the training format translation module 108 may use numeric vectors or tensors of user actions of various lengths (e.g., numeric vectors having various "N" values.) to train the neural network model. According to some aspects, the neural network training module 110 generates a trained TensorFlow model using the numeric vectors or tensors of user actions as training data. According to some aspects, the neural network training module 110 may bypass using tensors generated by the training format translation module 108 to perform model training using an unsupervised approach. To perform unsupervised training, the neural network training module 110 may directly use the application log data 102 as input.

According to some aspects, the trained neural network model generated at the AI-model training server 104 is reduced and translated into a compressed/reduced neural network model 116. The compressed/reduced neural network model 116 is a lightweight device level model that is deployed at the user device 112. The reduced neural network model 116 may use significantly less computational power, memory, and/or energy consumption compared to an uncompressed ML model. According to some aspects, the reduced neural network model 116 may be used as part of a web browser at the user device 112.

According to some aspects, the model shrinking module 118 may generate the reduced neural network model 116 using a pruning, quantization, knowledge distillation, and/or factorization based compression approach. According to some aspects, pruning based model compression involve removing certain connections from a trained network or the neural network model. A quantization based model compression approach involves decreasing the size of the weights corresponding to the trained model or network. A distillation based model compression involves transferring knowledge from a large trained model to a smaller model for deployment by training the smaller model to emulating the outputs of the larger model. A factorization based compression approach may use a low-rank approximation to reduce parameter count and simplify the structure of the trained model.

According to some aspects, the reduced neural network model 116 may be a TensorFlow Lite model. A trained TensorFlow model is converted into a TensorFlow Lite model using a pruning, quantization, knowledge distillation, and/or factorization based compression approach.

According to some aspects, navigation breadcrumb information generated at the client device 112 is used as input to the reduced neural network model 116 to generate the navigation recommendation 120. According to some aspects, a breadcrumb trail is a record of a user's navigation history. A breadcrumb trail may be a linear link identification consisting of a row of page IDs and/or tag IDs. According to some aspects, the link identification information represents some aspects of a user's current state within an application.

According to some aspects, once a compressed model is deployed at the end device 112, an on-device breadcrumb log is defined and stored. According to some aspects, a breadcrumb log generated at the end device 112 may be similar to the application log data generated at the application log server 104, but contains only the necessary information for the compressed model (e.g., a user action sequence of a predefined length.). According to some aspects, at runtime, as the breadcrumb logs are generated, they are encoded and translated into a format that is consumable for the compressed model deployed in software at the end device 112. The reduced breadcrumb log contains only the necessary information which is needed for the model and is encoded and formatted into a breadcrumb tensor, which is the same data format used to train the model.

According to some aspects, the breadcrumb module 114 generates a breadcrumb log based on the user's interaction with an instance of the enterprise web application implemented at the user device 112. According to some aspects, the breadcrumb information is translated into a format that is similar to the numeric vectors or tensors of user actions generated by the training format translation module 108. For example, each breadcrumb numeric vector or tensor may be a predefined length sequence of page IDs and/or tab IDs. According to some aspects, the input to the reduced neural network model 116 may include information corresponding to the time of the day and/or the role of the user interacting with the instance of the web application at the user device 112. As a non-limiting example, inputs to the reduced neural network model 116 may include the following variables/fields: [user_role_ID, time of the day, ID_1, ID_2, . . . , ID_N]. The variable "user_role_ID" may identify the role of user that is interacting with the instance of the enterprise web application at the user device 112, and the variable "time of the day" may identify the time of the interaction. The "N" variables, "ID_1" through "ID_N," may correspond to identifiers of the sequence of pages/tabs visited by a user at the user device 112. According to some aspects, the AI-model training server 104 provides the user device 112 with a recommended input numeric vector length (e.g., value of N). According to some aspects, the length of the input vectors may be increased to improve accuracy of the generated recommendations.

According to some aspects, a request to generate a navigation recommendation 120 may be sent to the reduced neural network model 116 form within the instance of the enterprise web application that is running at the user device 112. According to some aspects, the navigation recommendation 120 may include a list of potential pages and/or tabs that the user may navigate to. According to some aspects, the listed pages and/or table in the navigation recommendation 120 may also include an associated probability and/or a confidence value that indicates the confidence level the model associates with the generated recommendation. According to some aspects, a user may provide feedback regarding their perceived usefulness/accuracy of the navigation recommendation 120. According to some aspects, the reduced neural network model 116 may use a set of input numeric vectors and the navigation recommendations that were generated in response to the input vectors to train and/or fine-tune the reduced neural network model locally at the user device 112. According to some aspects, user feedback may be used to train and/or fine-tune the reduced neural network model locally at the user device 112.

Figure 2:
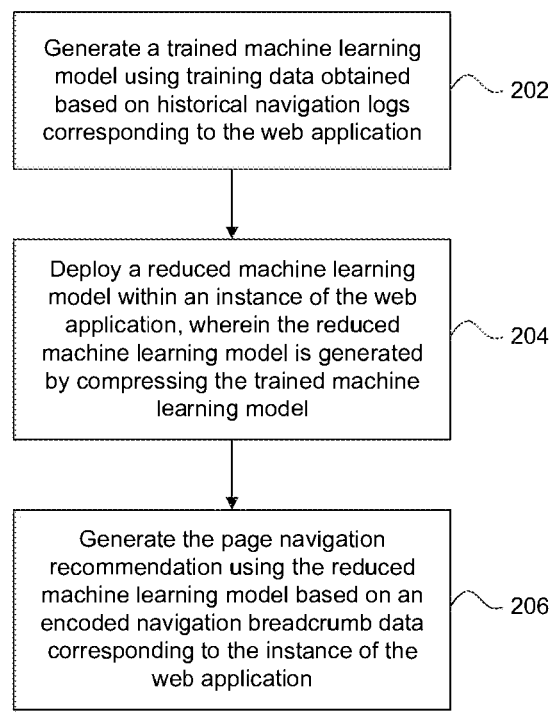
FIG. 2 illustrates a flowchart diagram of an exemplary method for implementing a neural network model to generate a page navigation recommendation, according to some embodiments.

FIG. 2 is a flowchart for method 200 for implementing API self-paced migration, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to those example embodiments.

In step 202, a trained machine learning or a trained neural network model is generated by the neural network training module 110 using training data obtained based on historical navigation logs corresponding to the web application. According to some aspects, the historical navigation logs are the application log data 102 that are created in response to application interaction activity generated by all users within an organization.

According to some aspects, each entry of the application log may include a page ID or a tab ID, a user ID, and a time stamp denoting the date and time of the day at which the user interaction/activity has occurred. According to some aspects, the behavior sequence module 106 may use the time stamp information in the application log data 102 to cluster the application logs and/or identify sequences of user actions. According to some aspects, information corresponding to a user action sequence may include page IDs corresponding to a chronological sequence of pages of the enterprise application that were visited by the user.

According to some aspects, the training format translation module 108 converts the user action sequences identified by the behavioral sequencing module 106 into numeric vectors or tensors of user actions. Each numeric vector generated by the training format translation module 108 may correspond to a sequence of pages of the enterprise web application visited by the user. The numeric vectors or tensors of user actions generated by the training format translation module 108 may be used as training data by the neural network training module 110 to generate the a trained machine learning or a trained neural network model.

In step 204, a reduced machine learning or neural network model is deployed within an instance of the web application deployed at user device 112. According to some aspects, the reduced machine learning model is generated by the model shriving module 118 using the trained machine learning model generated by the neural network training module 110. According to some aspects, the reduced machine learning model is generated using one or more of a quantization based algorithm, a factorization based algorithm, a distillation based algorithm, or a pruning based algorithm. According to some aspects, the reduced neural network model 116 may be a TensorFlow Lite model.

In step 206, the navigation recommendation 120 may be generated by the reduced machine learning model using encoded navigation breadcrumb data generated at the user device 112. According to some aspects, the encoded navigation breadcrumb data is generated from breadcrumb logs that are created based on the user's interaction with an instance of the enterprise web application implemented at the user device 112. According to some aspects, the breadcrumb information is translated into a format that is similar to the numeric vectors or tensors of user actions generated by the training format translation module 108. For example, each breadcrumb numeric vector or tensor may be a predefined length sequence of page IDs and/or tab IDs. According to some aspects, the input to the reduced neural network model 116 may include information corresponding to the time of the day and/or the role of the user interacting with the instance of the web application at the user device 112.

According to some aspects, a navigation recommendation 120 includes multiple pages and/or tabs. Each of the pages and/or tabs includes in the navigation recommendation may be associated with a confidence value generated by the reduced neural network model. The user may select, for the navigation recommendation 120, a page or a tab to navigate to next based on an associated confidence value. According to some aspects, to improve the relevance and accuracy of the navigation recommendations 120, the reduced machine learning model 120 may be further fine-tuned based on the input navigation breadcrumb data and the generated navigation recommendations 120.

Figure 3:
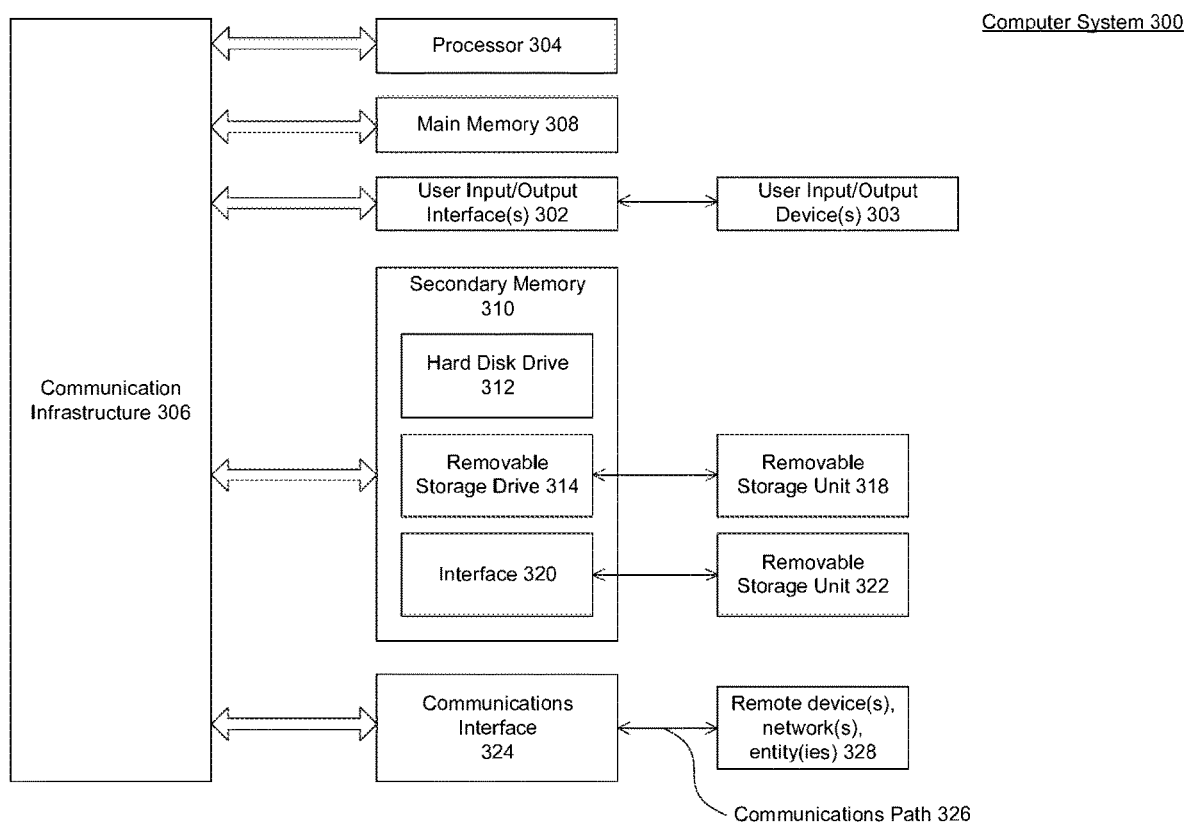
FIG. 3 depicts an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for generating a page navigation recommendation for a web application at a user device, comprising:
deploying, at the user device, a reduced machine learning model within an instance of the web application, wherein the reduced machine learning model is generated by compressing a trained machine learning model generated using training data obtained based on historical navigation logs corresponding to the web application;
encoding, at the user device, a navigation breadcrumb log corresponding to the instance of the web application to generate an encoded navigation breadcrumb log consumable for the reduced machine learning model, wherein the encoded navigation breadcrumb log comprises a same data format as the historical navigation logs;
generating, at the user device, the page navigation recommendation and a confidence value associated with the page navigation recommendation by applying the encoded navigation breadcrumb log to the reduced machine learning model;
tuning, at the user device based on the encoded navigation breadcrumb log, the page navigation recommendation, and a user feedback, the reduced machine learning model to increase the confidence value associated with the page navigation recommendation, the user feedback comprising selecting, based on the confidence value, a next page to which the page navigation recommendation should navigate;
generating, at the user device, another page navigation recommendation using the tuned reduced machine learning model based on another encoded navigation breadcrumb log corresponding to the instance of the web application; and
outputting, at the user device, the other page navigation recommendation.

2. The method of claim 1, wherein the generating the page navigation recommendation further comprises:
determining, by the reduced machine learning model, a plurality of next-page predictions and a plurality of corresponding confidence values; and
selecting as the page navigation recommendation a subset of the plurality of next-page predictions based on the plurality of corresponding confidence values.

3. The method of claim 1, further comprising:
training, at the user device, the reduced machine learning model based on the encoded navigation breadcrumb log.

4. The method of claim 1, wherein the reduced machine learning model is generated by compressing the trained machine learning model using one or more of a quantization based algorithm, a factorization based algorithm, a distillation based algorithm, or a pruning based algorithm.

5. The method of claim 1, wherein the encoded navigation breadcrumb log comprises a numeric vector corresponding to a sequence of pages visited at the user device.

6. The method of claim 1, wherein an entry of the historical navigation logs comprises a user identifier, a page identifier, and a time stamp.

7. The method of claim 1, wherein the trained machine learning model is generated based on a neural network modeling.

8. A system for generating a page navigation recommendation for a web application at a user device, comprising:
a memory; and
at least one processor coupled to the memory and configured to:
deploy, at the user device, a reduced machine learning model within an instance of the web application, wherein the reduced machine learning model is generated by compressing a trained machine learning model generated using training data obtained based on historical navigation logs corresponding to the web application;

encode, at the user device, a navigation breadcrumb log corresponding to the instance of the web application to generate an encoded navigation breadcrumb log consumable for the reduced machine learning model, wherein the encoded navigation breadcrumb log comprises a same data format as the historical navigation logs;

generate, at the user device, the page navigation recommendation and a confidence value associated with the page navigation recommendation by applying the encoded navigation breadcrumb log to the reduced machine learning model;

tune, at the user device based on the encoded navigation breadcrumb log, the page navigation recommendation, and a user feedback, the reduced machine learning model to increase the confidence value associated with the page navigation recommendation, the user feedback comprising selecting, based on the confidence value, a next page to which the page navigation recommendation should navigate;

generate, at the user device, another page navigation recommendation using the tuned reduced machine learning model based on another encoded navigation breadcrumb log corresponding to the instance of the web application; and output, at the user device, the other page navigation recommendation.

9. The system of claim 8, wherein to generate the page navigation recommendation, the at least one processor is further configured to;

determine a plurality of next-page predictions and a plurality of corresponding confidence values; and select as the page navigation recommendation a subset of the plurality of next-page predictions based on the plurality of corresponding confidence values.

10. The system of claim 8, wherein the at least one processor is further configured to:

train, at the user device, the reduced machine learning model based on the encoded navigation breadcrumb log.

11. The system of claim 8, wherein the reduced machine learning model is generated by compressing the trained machine learning model using one or more of a quantization based algorithm, a factorization based algorithm, a distillation based algorithm, or a pruning based algorithm.

12. The system of claim 8, wherein the encoded navigation breadcrumb log comprises a numeric vector corresponding to a sequence of pages visited at the user device.

13. The system of claim 8, wherein an entry of the historical navigation logs comprises a user identifier, a page identifier, and a time stamp.

14. A non-transitory computer-readable medium (CRM) having instructions stored thereon that, when executed by at least one computing device, causes the at least one computing device to perform operations comprising:

deploying, at a user device, a reduced machine learning model within an instance of a web application running, wherein the reduced machine learning model is generated by compressing a trained machine learning model generated using training data obtained based on historical navigation logs corresponding to the web application;

encoding, at the user device, a navigation breadcrumb log corresponding to the instance of the web application to generate an encoded navigation breadcrumb log consumable for the reduced machine learning model, wherein the encoded navigation breadcrumb log comprises a same data format as the historical navigation logs;

generating, at the user device, the page navigation recommendation and a confidence value associated with the page navigation recommendation by applying the encoded navigation breadcrumb log to the reduced machine learning model;

tuning, at the user device based on the encoded navigation breadcrumb log, the page navigation recommendation, and a user feedback, the reduced machine learning model to increase the confidence value associated with the page navigation recommendation, the user feedback comprising selecting, based on the confidence value, a next page to which the page navigation recommendation should navigate;

generating, at the user device, another page navigation recommendation using the tuned reduced machine learning model based on another encoded navigation breadcrumb log corresponding to the instance of the web application; and outputting, at the user device, the other page navigation recommendation.

15. The non-transitory CRM of claim 14, wherein the generating the page navigation recommendation further comprises:

determining, by the reduced machine learning model, a plurality of next-page predictions and a plurality of corresponding confidence values; and selecting as the page navigation recommendation a subset of the plurality of next-page predictions based on the plurality of corresponding confidence values.

16. The non-transitory CRM of claim 14, wherein the reduced machine learning model is generated by compressing the trained machine learning model using one or more of a quantization based algorithm, a factorization based algorithm, a distillation based algorithm, or a pruning based algorithm.

17. The non-transitory CRM of claim 14, wherein the encoded navigation breadcrumb log comprises a numeric vector corresponding to a sequence of pages visited at the user device.

* * * * *

UNITED STATES PATENT AND TRADEMARK OFFICE
CERTIFICATE OF CORRECTION

| | | |
|---|---|---|
| PATENT NO. | : 12,399,947 B2 | Page 1 of 1 |
| APPLICATION NO. | : 17/948678 | |
| DATED | : August 26, 2025 | |
| INVENTOR(S) | : Mangano et al. | |

It is certified that error appears in the above-identified patent and that said Letters Patent is hereby corrected as shown below:

On the Title Page

Column 1, Item (72), in "Inventors", Line 2, delete "San Meteo," and insert -- San Mateo, --, therefor.

In the Claims

In Column 10, Claim 7, Line 58, delete "modeling." and insert -- model. --, therefor.

In Column 11, Claim 9, Line 33, delete "to;" and insert -- to: --, therefor.

Signed and Sealed this
Eleventh Day of November, 2025

John A. Squires
*Director of the United States Patent and Trademark Office*